US010845102B2

(12) United States Patent
Ibrahim et al.

(10) Patent No.: US 10,845,102 B2
(45) Date of Patent: *Nov. 24, 2020

(54) HEAT PUMP SYSTEM WITH CHILLED WATER TANK AND PHOTOVOLTAIC THERMAL COLLECTOR

(71) Applicant: KING FAHD UNIVERSITY OF PETROLEUM AND MINERALS, Dhahran (SA)

(72) Inventors: Nasiru I. Ibrahim, Dhahran (SA); Fahad A. Al-Sulaiman, Dhahran (SA); Palanichamy Gandhidasan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 68 days.

This patent is subject to a terminal disclaimer.

(21) Appl. No.: 16/053,302

(22) Filed: Aug. 2, 2018

(65) Prior Publication Data
US 2018/0340716 A1    Nov. 29, 2018

Related U.S. Application Data

(63) Continuation of application No. 14/944,201, filed on Nov. 17, 2015, now Pat. No. 10,066,856.

(51) Int. Cl.
*F25B 27/00* (2006.01)
*F25B 30/04* (2006.01)
(Continued)

(52) U.S. Cl.
CPC ........ *F25B 27/007* (2013.01); *F24D 11/0221* (2013.01); *F24D 11/0264* (2013.01);
(Continued)

(58) Field of Classification Search
CPC ......... F25B 27/007; F25B 30/04; F24S 60/30; Y02B 10/24; Y02B 10/20; Y02B 30/13;
(Continued)

(56) References Cited

U.S. PATENT DOCUMENTS

| 4,070,870 A | * | 1/1978 | Bahel | ................... F24D 11/003 |
| | | | | 62/235.1 |
| 4,153,104 A | * | 5/1979 | Ruder | ................. F24D 11/0221 |
| | | | | 165/48.2 |

(Continued)

FOREIGN PATENT DOCUMENTS

| CN | 102494441 | 6/2012 |
| CN | 103983042 | 8/2014 |

(Continued)

*Primary Examiner* — Paul Alvare
*Assistant Examiner* — Kirstin U Oswald
(74) *Attorney, Agent, or Firm* — Oblon, McClelland, Maier & Neustadt, L.L.P.

(57) ABSTRACT

The integrated solar absorption heat pump system includes an absorption heat pump assembly (AHPA) having a generator, a condenser in fluid communication with the generator, an evaporator/absorber in fluid communication with the condenser and the generator, and a heat exchanger in communicating relation with the evaporator/absorber; a solar collector in fluid communication with the generator of the AHPA; a photovoltaic thermal collector in communicating relation with the evaporator/absorber of the AHPA; a plurality of pumps configured for pumping a fluid throughout the system to provide the desired heating or cooling; a power storage source, e.g., a solar battery, in communicating relation with the photovoltaic thermal collector; and a coil unit in communicating relation to the evaporator/absorber for receiving an air-stream. The absorption heat pump assembly can include an absorber and a solution heat exchanger.

4 Claims, 1 Drawing Sheet

(51) Int. Cl.
*F24D 11/02* (2006.01)
*F24H 4/04* (2006.01)
*F24S 60/30* (2018.01)
*F24D 19/10* (2006.01)

(52) U.S. Cl.
CPC ........... *F24D 19/1039* (2013.01); *F24H 4/04* (2013.01); *F24S 60/30* (2018.05); *F25B 30/04* (2013.01); *F24D 2200/02* (2013.01); *F24D 2200/12* (2013.01); *F24D 2200/14* (2013.01); *F24H 2240/09* (2013.01); *Y02A 30/272* (2018.01); *Y02A 30/277* (2018.01); *Y02A 30/62* (2018.01); *Y02B 10/20* (2013.01); *Y02B 10/24* (2013.01); *Y02B 10/70* (2013.01); *Y02B 30/13* (2018.05); *Y02B 30/62* (2013.01)

(58) Field of Classification Search
CPC ..... Y02B 10/70; Y02B 30/62; F24D 2200/02; F24D 2200/12; F24D 2200/14; F24D 11/0221; F24D 11/0264; F24D 19/1039; F24H 2240/09; F24H 4/04; Y02A 30/277; Y02A 30/272; Y02A 30/62
USPC .......................................................... 62/235.1
See application file for complete search history.

(56) References Cited

U.S. PATENT DOCUMENTS

| | | | | | |
|---|---|---|---|---|---|
| 4,248,049 | A | * | 2/1981 | Briley | F24D 11/0221 62/235.1 |
| 4,251,997 | A | * | 2/1981 | Newton | F25B 15/00 62/101 |
| 4,285,333 | A | * | 8/1981 | Tanaka | F24S 40/70 126/586 |
| 4,290,273 | A | * | 9/1981 | Meckler | F25B 15/02 62/148 |
| 4,304,955 | A | * | 12/1981 | Meckler | F24F 3/1417 136/259 |
| 4,309,986 | A | * | 1/1982 | Eastman | F24S 20/25 126/592 |
| 4,323,052 | A | * | 4/1982 | Stark | C02F 1/14 126/571 |
| 4,386,501 | A | * | 6/1983 | Jaeger | F25B 15/00 62/112 |
| 4,512,157 | A | * | 4/1985 | Weadock | F03G 6/001 60/641.8 |
| 4,532,778 | A | * | 8/1985 | Clark | F25B 15/08 62/477 |
| 4,574,051 | A | | 3/1986 | Matthews et al. | |
| 4,616,487 | A | * | 10/1986 | Franklin | F24D 11/0257 62/235.1 |
| 4,686,961 | A | * | 8/1987 | Garrison | F24S 10/90 126/635 |
| 4,813,242 | A | * | 3/1989 | Wicks | F25B 15/008 62/238.3 |
| 2007/0278989 | A1 | * | 12/2007 | Leboff | H02J 7/35 320/101 |
| 2008/0011289 | A1 | * | 1/2008 | Sichanugrist | H01L 31/048 126/634 |
| 2008/0211230 | A1 | | 9/2008 | Gurin | |
| 2011/0048502 | A1 | * | 3/2011 | Kikinis | F24D 11/0221 136/248 |
| 2011/0308576 | A1 | * | 12/2011 | Chatterjee | H02S 40/44 136/248 |
| 2011/0314856 | A1 | * | 12/2011 | Willgohs | F24D 17/02 62/235.1 |
| 2013/0098354 | A1 | * | 4/2013 | Kummamuru | F03G 6/067 126/600 |
| 2014/0250931 | A1 | * | 9/2014 | Chen | F24S 60/30 62/235.1 |

FOREIGN PATENT DOCUMENTS

| | | |
|---|---|---|
| EP | 2 808 640 | 12/2014 |
| GB | 2 076 523 | 12/1981 |

* cited by examiner

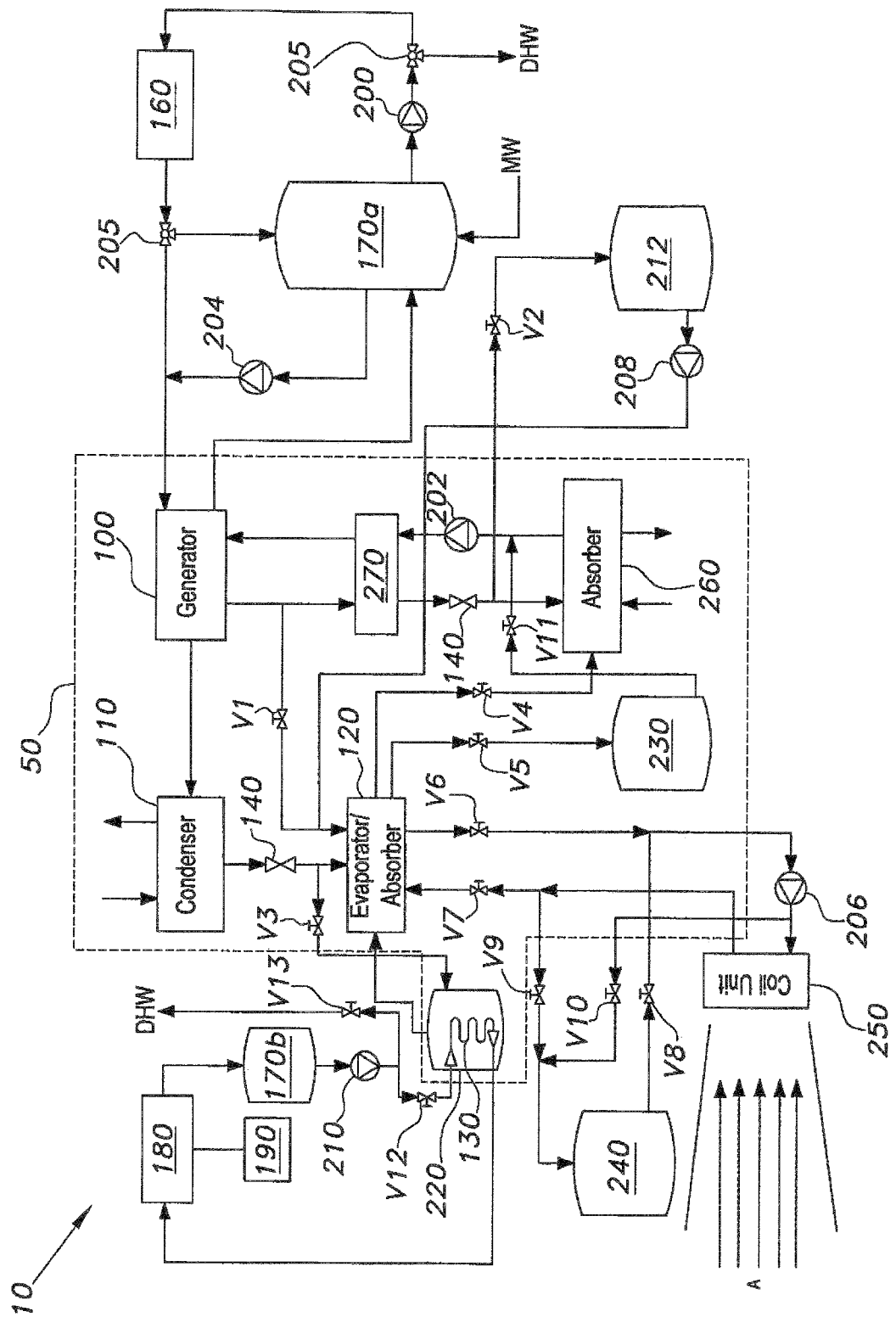

HEAT PUMP SYSTEM WITH CHILLED WATER TANK AND PHOTOVOLTAIC THERMAL COLLECTOR

CROSS-REFERENCE TO RELATED APPLICATIONS

The present application is a Continuation of Ser. No. 14/944,201, having a filing date of Nov. 17, 2015, now allowed.

BACKGROUND OF THE INVENTION

1. Field of the Invention

The present invention generally relates to heating systems, and particularly to an integrated solar absorption heat pump system for cooling, heating, and generating electricity.

2. Description of the Related Art

Currently, fossil fuels, such as coal and oil, are being consumed in significant quantities to provide electricity for much of the world's heating and cooling demands. Such consumption can have dramatic adverse effects on our environment. For example, global warming, which can affect much of the world's weather patterns, has been attributed to the significant consumption of fossil fuels. Further, not only is the consumption of fossil fuels dangerous for the environment, it can also be an extremely costly source of fuel for home heating during the winter time or cool the home during the summer time. As such, countries have been spending significant amounts of capital researching renewable energy sources and developing systems that can utilize such renewable energy sources, such as solar energy, to provide the necessary electricity to heat and cool homes and businesses in a cost-efficient manner and without adversely affecting the environment. For example, systems having different configurations have been developed for harnessing and utilizing solar energy through the use of solar collectors and photovoltaic modules, respectively, to produce thermal and electrical energy.

Despite the different configurations that have been developed to harness and utilize solar energy, such systems are often ineffective due to the intermittent nature of solar energy, i.e., periods of high solar radiation (summer time) versus periods of low solar radiation (winter time), which can create disparities between the supply of energy and the demand for it, since these systems cannot properly store the thermal energy harnessed by the photovoltaic thermal collector and the solar collector.

Thus, an integrated solar absorption heat pump system solving the aforementioned problems is desired.

SUMMARY OF THE INVENTION

The integrated solar absorption heat pump system includes: an absorption heat pump assembly (AHPA) having a generator, a condenser positioned in fluid communication with the generator, an evaporator/absorber positioned in fluid communication with the condenser and the generator, and a heat exchanger positioned in communicating relation with the evaporator/absorber, a solar collector positioned in fluid communication with the generator of the AHPA; a photovoltaic thermal collector positioned in communicating relation with the evaporator/absorber of the AHPA; a plurality of pumps configured for pumping a fluid throughout the system to provide the desired heating or cooling; a power storage source, e.g. a solar battery, positioned in communicating relation with the photovoltaic thermal collector; and a coil unit positioned in communicating relation to the evaporator/absorber for receiving an air-stream. The absorption heat pump assembly can also include an absorber and a solution heat exchanger.

These and other features of the present invention will become readily apparent upon further review of the following specification and drawings.

BRIEF DESCRIPTION OF THE DRAWINGS

The sole drawing FIGURE is a schematic diagram of an integrated solar absorption heat pump system according to the present invention.

DETAILED DESCRIPTION OF THE PREFERRED EMBODIMENTS

Referring to the sole drawing, the integrated solar absorption heat pump system 10 includes an absorption heat pump assembly (AHPA) 50, a solar collector 160 in fluid communication with the AHPA 50, a photovoltaic thermal collector 180 in fluid communication with the AHPA 50, and a power storage source 190 positioned in communicating relation with the photovoltaic thermal collector 180. The AHPA 50 has a generator 100 in fluid communication with the solar collector 160, a condenser 110 in fluid communication with the generator 100, an evaporator/absorber 120 in fluid communication with the condenser 110 and the generator 100, and a heat exchanger 130 in fluid communication with the evaporator/absorber 120. The AHPA 50 can also include a solution heat exchanger 270 in fluid communication with the generator 100, and an absorber 260 in fluid communication with the evaporator/absorption 120 and the solution heat exchanger 270.

The system 10 also includes a plurality of tanks, such as a first hot water tank 170a in fluid communication with the solar collector 160, a second hot water tank 170b in fluid communication with the photovoltaic thermal collector 180, a concentrated solution tank 212, a water tank 220, a weak solution tank 230 configured for receiving and storing a weak working fluid, e.g., a weak LiBr solution, from the evaporator/absorber 120 of the AHPA 50, and a chilled water tank 240 configured for receiving and collecting any surplus chilled water generated from the evaporator/absorber 120 of the AHPA 50, such as during the summer time, that can be used to meet a portion of the cooling demands, such as cooling during the nighttime, as well as a plurality of expansion valves 140, a plurality of control valves, such as valve V1-V13, and a plurality of two-way valves 205 configured for regulating the flow of a fluid, such as a working fluid, such as lithium bromide/water (LiBr/$H_2O$), throughout the system 10. Other suitable working fluids can include lithium chloride/water (LiCl/$H_2O$), sodium hydroxide/water (NaOH/$H_2O$), sodium sulfide/water ($Na_2S$/$H_2O$), and magnesium sulfate heptahydrate ($MgSO_4 7H_2O$), depending on the desired application(s).

Further, the system 10 includes a plurality of pumps (including first pump 200, second pump 202, third pump 204, fourth pump 206, fifth pump 208, and sixth pump 210) and a coil unit 250 configured for receiving an air stream A and cooling or heating the air stream A by circulating the cold water or the hot water, respectively, received from the evaporator/absorber 120 of the AHPA 50. Each of the pumps 200-210 is configured for pumping the working fluid within the system 10. The second pump 202 can be a vacuum pump configured for allowing the AHPA 50 to operate under vacuum conditions, since it can be a closed system, as described further below. A cooling tower (not shown) can be positioned in communicating relation with the condenser 110 and with the absorber 260 to provide the necessary cooling water to the AHPA 50.

The AHPA 50 is a single-effect closed system that can work between low pressure (such as a pressure less than 1 kPa) and high pressure (such as a pressure of about 10 kPa) in a vacuum. As discussed further below, the AHPA 50 can receive its energy from the hot water discharged by from solar collector 160 or the hot water discharged from the first hot water tank 170a in order to generate a weak LiBr solution while operating in cooling or heating modes. It is to be understood that the AHPA 50 can also be a multi-effects assembly, such as a double- or a triple-effect assembly, depending on the heating and cooling demands, which can determine the size of the system 10. The multi-effect AHPA 50 can offer a higher coefficient of performance than the single-effect AHPA 50.

The solar collector 160 may be any type of suitable collector, such as an evacuated tube solar collector having an array of tubes through which the working fluid can pass. The solar collector 160 receives solar energy from the sun and converts the solar energy to thermal energy in order to generate hot water having a temperature of about 90° C. that can be used to regenerate the weak LiBr solution in the generator 100 of the AHPA 50, as discussed further below. The hot water can also be suitable for domestic use as domestic hot water DHW. Other types of solar collectors, such as flat plate collectors, a compound parabolic concentrator, or a parabolic trough, can be used to heat the working fluid instead of an evacuated tube solar collector.

The photovoltaic thermal collector 180 may be any suitable type of photovoltaic thermal collector, such as a sheet-and-tube solar collector having an absorber covered by a photovoltaic layer, that can produce sufficient electrical energy to power the plurality of pumps 200-210 throughout the system 10 and to heat water. The photovoltaic layer can be silicon-based (e.g., crystalline silicon, amorphous silicon thin film), a non-silicon-based thin film (e.g., cadmium telluride (CdTe)), or can be formed from any suitable material, such as quantum solar cells. It is to be understood that the photovoltaic thermal collector 180 is in thermal communication with the water circulating through tubes positioned at the back of the photovoltaic layer to lower the temperature of the cells, which can increase electrical efficiency. This can, in turn, heat the water, which can then be stored in the second hot water tank 170b. The photovoltaic thermal collector 180 can be configured as different components, such as a photovoltaic layer and a thermal collector. Further, the power storage source 190 may be any type of power storage source, such as a solar battery, that can store any excess electricity generated by the photovoltaic thermal collector 180 to power lights (not shown) and/or each of the pumps 200-210, such as at night or during periods of low solar radiation, e.g., during cloudy days.

The water tank 220 may be any suitable type of water tank configured for receiving and collecting a portion of the condensed water produced in the condenser 110 of the AHPA 50, such as through the expansion valve 140 associated with the condenser 110, e.g., during periods of high solar radiation.

The concentrated solution tank 212 may be any suitable type of tank configured for receiving and collecting a portion of the concentrated solution of the working fluid, such as LiBr, from the generator 100 of the AHPA 50, such as through the solution heat exchanger 270, during periods of high solar radiation so that the concentrated solution of the working fluid, i.e., LiBr, can be used at other times (e.g., nights or times of high cloud coverage) to meet the required heating demands. Further, the water stored in the water tank 220 may be used in conjunction with the concentrated solution, i.e., LiBr, from the concentrated solution tank 212 to meet the required heating demands during the winter.

The first hot water tank 170a and the second hot water tank 170b may be any suitable type of hot water tanks and may be formed from any suitable material, such as metal, and may include a suitable type of insulation to allow them to keep the water hot during cool and nighttime conditions. For example, the first hot water tank 170a may be configured for receiving and collecting hot water from the solar collector 160 that can aid in cooling or heating, such as at night during the summer or during the winter, respectively. The second hot water tank 170b, on the other hand, may be configured for receiving and collecting hot water, such as water having a temperature in the range of about 40° C. to 60° C., from the photovoltaic thermal collector 180 during the days in the summer and winter, such as for heat storage. The hot water from the second hot water tank 170b may be used to vaporize the water in the water tank 220 via the heat exchanger 130 positioned within the water tank 220, the water being stored at a low pressure, such as a pressure less than 1 kPa, for the purpose of heating in winter. The hot water from both the first hot water tank 170a and the second hot water tank 170b may also be used domestically as domestic hot water DHW.

Each of the valves V1-V13 can be any type of suitable valve, such as a ball valve, a butterfly valve, or a check valve, that allows the working fluid to circulate throughout the system 10. Further, each of the valves V1-V13 can be formed from any suitable, durable material, such as metal. Similarly, each of the two-way valves 205 can be any type of suitable two-ways valve that can regulate the flow of hot water to and from the first hot water tank 1170a, such as for domestic hot water DMW. Each of the expansion valves 140 can be any suitable type of expansion valve that can control the amount of working fluid flowing into the evaporator/absorber 120 and the absorber 260, respectively.

By way of operation, it is to be noted that the system 10 can be used both for cooling, such as during the daytime or during the nighttime in the summer months, and for heating, such as during the daytime or during the nighttime in the winter months. It is to be noted that the system 10 can operate continuously throughout the day and night.

For the system 10 to be used for cooling during the daytime in the summer months (i.e., cooling mode), a user can activate the first pump 200 to circulate a collector fluid, such as water, from the solar collector 160 to the generator 100 to regenerate a weak solution of LiBr (or any other similar brine) leaving the absorber 260 at a high pressure, such as a pressure of about 10 kPa. It is to be noted that the solar collector 160 converts solar energy into thermal energy to heat the collector fluid, e.g., water, and thereby generate hot water, such as water having a temperature of approximately 90° C. The hot water received by the generator 100 from the solar collector 160 is used to evaporate the water in the weak LiBr solution in the generator 100 to form water vapor and a concentrated LiBr solution. The water vapor can, subsequently, be transferred to the condenser 110, while the concentrated LiBr solution in the generator 100 can be directed to the absorber 260 through the solution heat exchanger 270 and the expansion valve 140 associated with the solution heat exchanger 270. The portion of the hot water leaving the generator 100 can be redirected to the first hot water tank 170a for use as domestic hot water DHW.

The condenser 110 and the absorber 260 can then be used to condense the water vapor and the concentrated LiBr solution, respectively, while in cooling mode. It is to be noted that the cooling of the water vapor and the concentrated LiBr solution in the condenser 110 and the absorber 260, respectively, can occur through ambient cooling. However, it is to be understood that both the condenser 110 and the absorber 260 can be positioned in communicating relation with cooling towers (not shown) where cool water can be circulated and used to condense the water vapor in the condenser 110 and the concentrated LiBr solution in the absorber 260.

While in cooling mode, valve V1 may be closed and valve V2 may be controlled to regulate the amount of concentrated LiBr solution that is channeled into the concentrated solution tank 212 to charge the concentrated solution tank 212 during the hours of high solar radiation. Similarly, a portion of the condensed water from the condenser 110 may be transferred into the water tank 220 after being expanded in the expansion valve 150 associated with the condenser 110 during the hours of high solar radiation by controlling valve V3. The remaining portion of the condensed water leaving the condenser 110 can be transferred into the evaporator/absorber 120 at low pressure, such as a pressure less than 1 kPa, by closing valve V3.

In the evaporator/absorber 120, the water can be evaporated at low pressure, such as by withdrawing heat from the water so that it can act as space cooling water. The resulting water vapor in the evaporator/absorber 120 enters into the absorber 260 by opening valve V4 and by closing valve V5, where it can be absorbed by the concentrated LiBr solution to form a weak LiBr solution. The weak LiBr solution is then be transferred to the generator 100 by the second pump 202 through the solution heat exchanger 270 to complete the cycle. It is to be noted that the space cooling water can then be chilled and circulated through the coil unit 250. During this, valves V6 and V7 remain open to allow the space cooling water to circulate into and out of the evaporator/absorber 120, while valves V8 and V9 remain closed to prevent the space cooling water from circulating into and out of the chilled water tank 240. It is noted, however, that valve V10 may be opened to allow a portion of the space cooling water to flow into the chilled water tank 240 from the coil unit 250 for storage.

For the system 10 to be used for cooling during the nighttime in the summer months (i.e., cooling mode), the AHPA 50 can be deactivated at nighttime and the space cooling water from the chilled water tank 240 can be discharged and circulated by the fourth pump 206 through the coil unit 250 to partially or fully meet the cooling needs. For the space cooling water to circulate into the coil unit 250, valves V8 and V9 are opened, while valves V6, V7, and V10 are closed. This cooling operation can continue until the water temperature in the chilled water tank 240 becomes too high for cooling.

Another way for the system 10 to cool during the nighttime in the summer months (i.e., cooling mode), e.g., when the water temperature in the chilled water tank 240 becomes too high for cooling and can no longer meet the cooling demands at night, involves circulating the hot water from the first hot water tank 170a to drive the AHPA 50. For example, the hot water from the first hot water pump 170a can be pumped by the third pump 204 directly into the generator 100 to regenerate the weak LiBr solution from the absorber 260. The remainder of the process is similar to the process of cooling during the daytime in the summer months, as described above.

For the system 10 to be used for heating during the daytime in the winter months (i.e., heating mode), a user opens valve V1 and closes valve V3 to prevent cooling from taking place in the condenser 110 or in the absorber 260. By opening valve V1 the concentrated LiBr solution can pass from the generator 100 directly to the evaporator/absorber 120. It is noted that in this mode, the evaporator/absorber 120 acts as the absorber. The water vapor produced in the generator 100, such as by the mixing the hot water from the first hot water tank 170a with the weak LiBr solution in the generator 100, can pass through to the condenser 110 and the expansion valve 140 associated with the condenser 110 and enter the evaporator/absorber 120.

The water vapor and the concentrated LiBr solution mixes in the evaporator/absorber 120 to form a weak LiBr solution that can lead to the release of heat energy in an exothermic reaction, the heat being used to heat the water, e.g., space heating water circulated into the coil unit 250 by the fourth pump 206 and open valves V6 and V7. During this process a portion of the weak LiBr solution in the evaporator/absorber 120 may flow into the weak solution tank 230 for storage by opening valve V5. Further, the weak LiBr solution from the evaporator/absorber 120 is discharged from the weak solution tank 230 through valve V11 to produce a concentrated LiBr solution.

For the system 10 to be used for heating during the nighttime in the winter months (i.e., heating mode), e.g., in the absence of sunlight, hot water from the first hot water tank 170a may be used to provide heat. For example, the hot water from the first hot water tank 170a may be injected directly into the generator 100 by activating the third pump 204 to generate a weak LiBr solution from the absorber 260. The remainder of the process is similar to the process of heating during the daytime in the winter months, as described above.

The system 10 may provide space heating through thermochemical energy. For example, the stored water in the water tank 220 and the concentrated LiBr solution in the concentrated solution tank 212 make up the thermochemical energy storage, where the thermal energy is stored chemically at or near atmospheric temperature so that heat loss from the vessels is small. The use of thermochemical energy for heating can be considered as seasonal or long term energy storage, and as an alternative to meet part of the heating demands during periods of low or unavailable solar radiation, such as during cloudy days or nighttime.

As discussed above, the concentrated solution tank 212 and the water tank 220 may be charged with concentrated LiBr solution and water, respectively, in the summertime during periods of high solar radiation, e.g., daytime, and discharged in the winter time for space heating, e.g., at night when solar energy is unavailable to drive the AHPA 50.

During the discharging process, the fifth pump 208 is activated to circulate the concentrated LiBr solution from the concentrated solution tank 212 through the evaporator/absorber 120. At the same time, water from the water tank 220 is heated and vaporized to form water vapor by the hot water from the second hot water tank 170b flowing through the heat exchanger 130. It is to be noted that the hot water in the second hot water tank 170b may be generated from the photovoltaic thermal collector 180 by the water absorbing heat from the photovoltaic cells and then being discharged into the second hot water tank 170b. The sixth pump 210 may be activated to pump the hot water from the second hot water tank 170b through the heat exchanger 130 positioned within the water tank 220 to begin the cycle by opening valve V12 and closing valve V13 to prevent the hot water from the second hot water tank 170b from being discharged as domestic hot water DHW. Since the water tank 220 is in communication with the evaporator/absorber 120, e.g., by connection to the low pressure side of the evaporator/absorber 120, the vacuum conditions may cause the water in the water tank 220 to vaporize once the water comes into contact with the hot water from the second hot water tank 170b flowing through the heat exchanger 130 and back into the photovoltaic thermal collector 180.

The water vapor from the water tank 220 may then be absorbed by the concentrated LiBr solution to form a diluted or weak LiBr solution. It is to be noted that the evaporator/absorber 120 of the AHPA 50 works as an absorber during this mode of operation to release heat. The heat that is released may be used to heat a space heating fluid, such as water, circulating through the evaporator/absorber 120 and through the coil unit 250 for heating. For example, the weak LiBr may be discharged from the evaporator/absorber 120 of the AHPA 50 into the weak solution tank 230 for storage by closing valve V4 and opening valve V5. The weak solution tank 230 can be recharged during the discharge of the concentrated solution tank 212, and the concentrated solution tank 212 can be recharged during the discharge of the weak solution tank 230. For example, the weak solution tank 230 can be discharged in the summer by opening valve V11 to recharge the concentrated solution tank 212 for a new cycle.

It is to be understood that the present invention is not limited to the embodiments described above, but encompasses any and all embodiments within the scope of the following claims.

We claim:

1. An integrated solar absorption heat pump system, comprising:
    an absorption heat pump assembly including a generator, a condenser in fluid communication with the generator, an evaporator/absorber in fluid communication with the condenser and the generator, an expansion valve in fluid communication with the condenser, the generator and the evaporator/absorber, and a heat exchanger in communicating relation with the evaporator/ absorber;
    an evacuated tube solar collector in fluid communication with the generator of the absorption heat pump assembly;
    a photovoltaic thermal collector in communicating relation with the evaporator/absorber of the absorption heat pump assembly, wherein the photovoltaic thermal collector is a sheet-and-tube solar collector having an absorber covered by a photovoltaic layer comprising at least one of crystalline silicon, amorphous silicon and cadmium telluride;
    a plurality of pumps, each of the pumps being configured for pumping a fluid throughout the system;
    a first hot water tank in fluid communication with the solar collector and the generator of the absorption heat pump assembly, the first hot water heat tank being configured for storing hot water from the generator and the solar collector;
    a second hot water tank in fluid communication with the photovoltaic thermal collector and the heat exchanger, the second hot water tank being configured for receiving hot water from the photovoltaic thermal collector and discharging the hot water into the heat exchanger;
    a power storage source in communicating relation with the photovoltaic thermal collector;
    a coil unit in communicating relation to the evaporator/absorber;
    a water tank in fluid communication with the condenser and the evaporator/absorber of the absorption heat pump assembly;
    a chilled water tank in fluid communication with the evaporator/absorber of the absorption heat pump assembly;
    a weak solution tank in fluid communication with the evaporator/absorber and the absorber of the absorption heat pump assembly; and
    a concentrated solution tank in fluid communication with the evaporator/absorber of the absorption heat pump assembly.

2. The integrated solar absorption heat pump system according to claim 1, wherein the absorption heat pump assembly further comprises:
    an absorber in fluid communication with the evaporator/absorber; and
    a solution heat exchanger in fluid communication with the generator and the absorber.

3. The integrated solar absorption heat pump system according to claim 1, further comprising a plurality of control valves configured to regulate a flow of fluid throughout the system.

4. The integrated solar absorption heat pump system according to claim 1, wherein the power storage source comprises a solar battery configured for storing excess electricity generated by the photovoltaic thermal collector and for powering each of the plurality of pumps.

* * * * *